United States Patent [19]

Regat, deceased

[11] 4,313,164

[45] Jan. 26, 1982

[54] METHOD OF GENERATING SUBSURFACE CHARACTERISTIC MODELS

[75] Inventor: Charles Y. Regat, deceased, late of Paris, France, by Rolande Annette Blanche Ibarra, legal representative

[73] Assignee: Schlumberger Limited, New York, N.Y.

[21] Appl. No.: 19,926

[22] Filed: Mar. 12, 1979

Related U.S. Application Data

[63] Continuation of Ser. No. 178,148, Sep. 7, 1971, abandoned.

[51] Int. Cl.³ .................... G06F 15/20; E21B 47/00
[52] U.S. Cl. ................................. 364/422; 324/323; 324/339; 324/351
[58] Field of Search ............. 364/421, 422; 340/18 R, 340/860; 324/1, 6, 323, 339, 351; 73/151, 153

[56] References Cited

U.S. PATENT DOCUMENTS

| | | | |
|---|---|---|---|
| 3,166,709 | 1/1965 | Doll | 324/1 X |
| 3,405,349 | 10/1968 | Moran | 340/18 R X |
| 3,457,496 | 7/1969 | Schuster | 324/1 |
| 3,457,497 | 7/1969 | Schuster | 324/1 |
| 3,457,499 | 7/1969 | Tanguy | 324/1 |
| 3,457,500 | 7/1969 | Schuster | 324/1 |

*Primary Examiner*—Jerry Smith
*Attorney, Agent, or Firm*—Cooper, Dunham, Clark, Griffin & Moran

[57] ABSTRACT

A method of computer generating a subsurface characteristic model which is substantially consistent with readings taken in a well with a well logging device. A set of actual measurement values which represent readings taken over a given depth interval of a well is derived. An initial trial model of the subsurface characteristic under investigation is then selected. Next, a simulated measurement value at a particular depth level is generated by applying the approximate response characteristic of the logging device to the model. The simulated measurement value at the particular depth level is compared to the actual measurement value at that depth level and an error value is generated as a function of the comparison. The model is then modified in accordance with the error value, the modification being performed over a depth interval which includes the model beds within a preselected span from the particular depth level. The procedure is then performed in this manner for other particular depth levels within the given depth interval.

37 Claims, 12 Drawing Figures

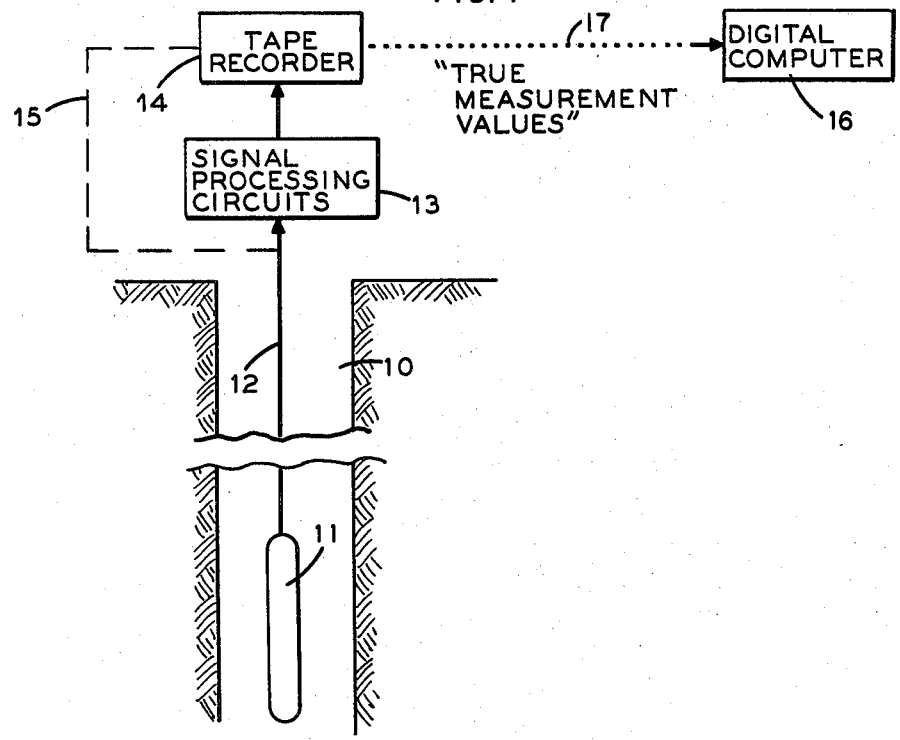
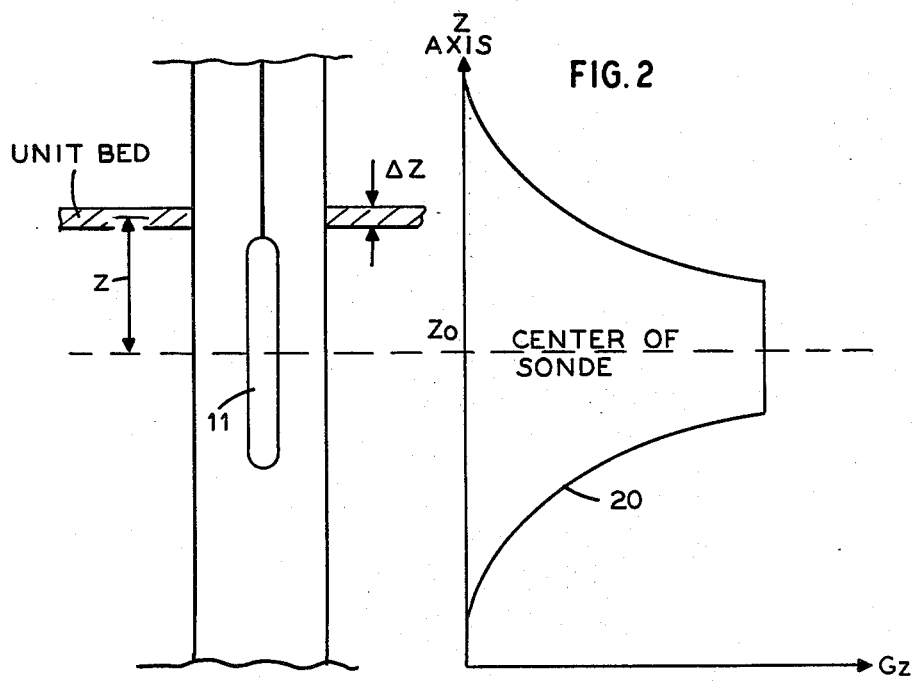

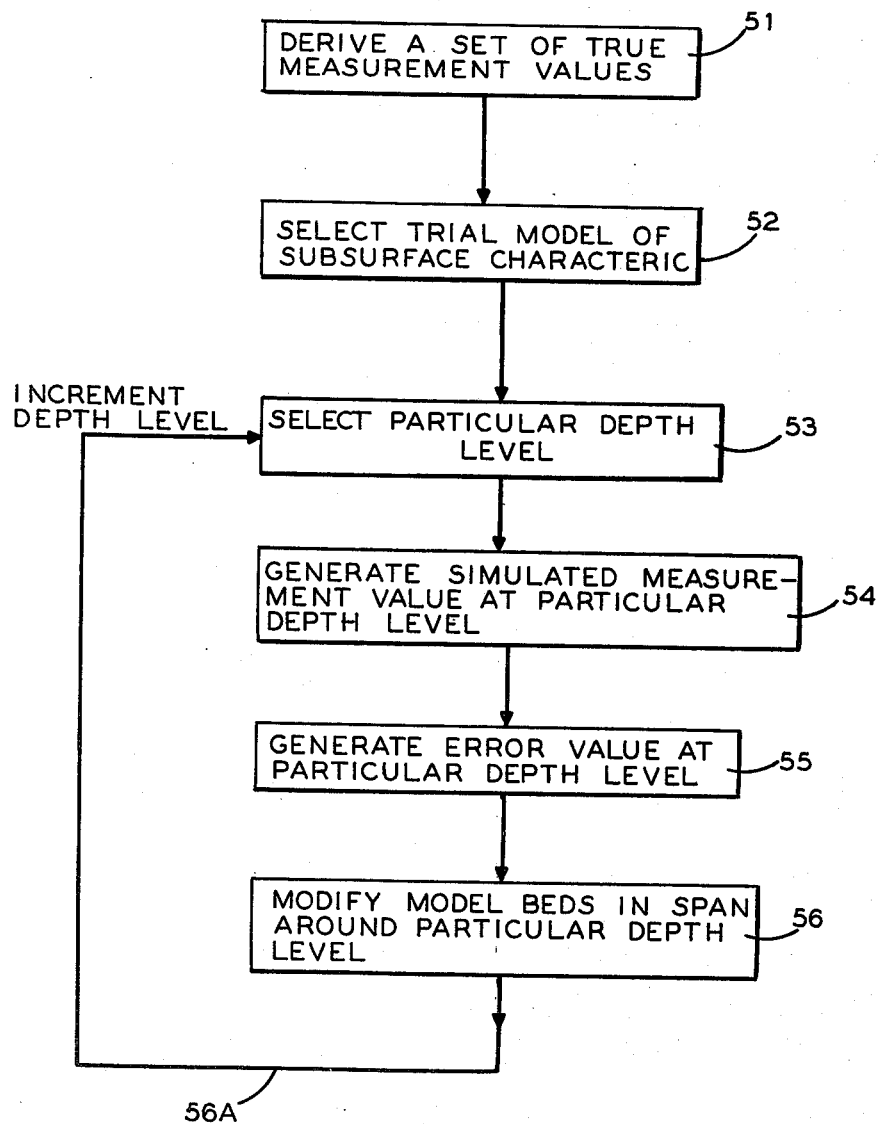

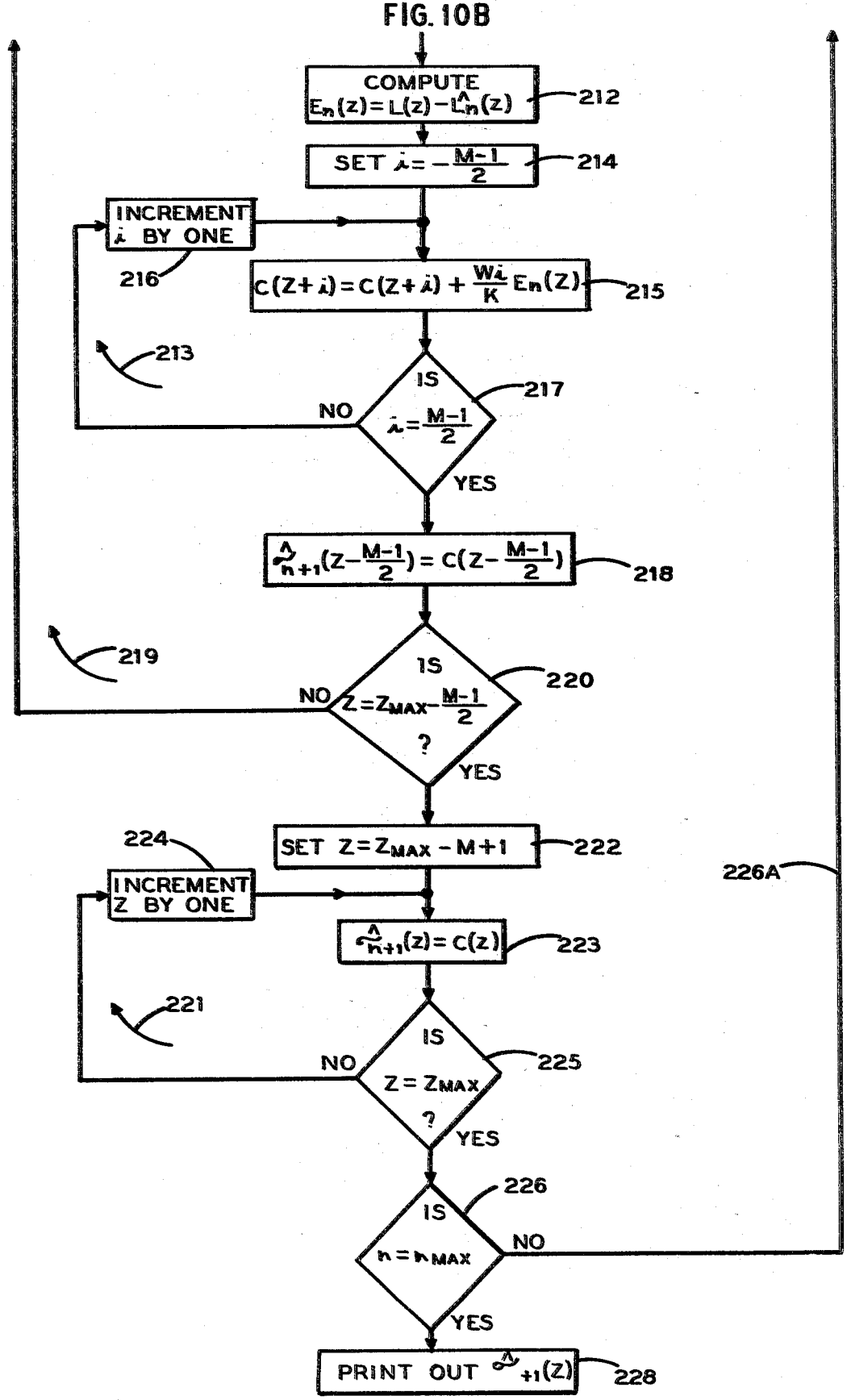

METHOD OF GENERATING SUBSURFACE CHARACTERISTIC MODELS

This is a continuation, of application Ser. No. 178,148 filed Sept. 7, 1971 and now abandoned.

BACKGROUND OF THE INVENTION

This invention relates to methods for generating models of the subsurface characteristics of a well and, more particularly, to a method of generating a subsurface characteristic model which is consistent with readings taken in a borehole with a well logging device.

The subject matter of this invention is related to subject matter disclosed in the following U.S. Patent Applications, each filed of even date herewith and assigned to the same assignee as the present invention: U.S. application Ser. No. 019,918 of F. Segesman; U.S. application Ser. No. 019,925 of W. Kenyon; and U.S. application Ser. No. 019,917 of J. Suau and W. Frawley.

In the drilling of an oil or gas well it is advantageous to obtain as much information as possible about the nature of the formations or beds surrounding the drilled borehole. To this end, well logging devices are lowered into the borehole to measure various characteristic properties of surrounding formations. In electrical logging, for example, a device which includes an electrical sensor is moved through the borehole and provides indications of the electrical resistivity or conductivity of the subsurface materials at different depth levels.

For many well logging applications it is desirable that the logging device respond only to a very limited portion of the formation material; i.e., the portion that is adjacent the device at the time a measurement is taken. This is not easily accomplished, however. Ideally, it would be desirable for the vertical resolution of the device to be sharpened such that the apparatus will respond to formation material only over a vertical interval of very narrow extent. This would enable relatively thin beds to be more readily distinguished and their characteristics to be more accurately measured. At the same time, it is often desirable for the logging device to have a reasonably extensive capability of investigation in a horizontal or radial direction. Not surprisingly, the two considerations are found to be countervailing.

Consider, as an example, the type of well logging apparatus known as an "induction logging" device which includes, inter alia, transmitter and receiver coils mounted in spaced relation on a sonde. Alternating current is applied to the transmitter coil and the alternating magnetic field thereby created generates eddy currents in the formations surrounding the borehole. The eddy currents, in turn, create a secondary magnetic field which induces an electromotive force in the receiver coil. The intensity of the eddy currents is a function of the formation conductivity which can therefore be measured by monitoring the induced electromotive force. The basic principles of induction logging are described in an article by H. G. Doll entitled "Introduction to Induction Logging and Application to Logging of Wells Drilled with Oil Base Mud" which appeared in the June, 1949 issue of the Petroleum Transactions of the AIME. Among the techniques which have been devised for sharpening (or "focusing") the vertical response of induction logging devices is to provide additional coils on the sonde. These "focusing coils" are utilized in phased relationship with the basic transmitter and receiver coils to effectively cancel portions of the device response which are above and below the central investigative region of the device. Unfortunately, the use of numerous additional coils in this manner tends to significantly decrease the horizontal range of the device, so there is a practical limit on the degree of such focusing which can be employed. Also, the required additional elements render the device more complex and expensive.

In addition to focusing methods which relate to the overall response characteristic of the downhole device, there have been previously developed vertical resolution improvement methods which are termed "computed focusing" techniques. Generally speaking, computed focusing techniques utilize signals which are, at a given instant, more representative of the formation material in the undesired regions to adjust or correct the signal which is, at the same instant, more representative of the desired region. Computed focusing techniques are described, for example, in U.S. Pat. No. 3,166,709 of H. G. Doll, U.S. Pat. No. 3,230,445 of W. J. Sloughter et al, and U.S. Pat. No. 3,457,496 of N. Schuster. These patents describe systems that receive signals from a downhole sensing device and generate computed signals which approximate the response that would have been obtained from a sensing device having a sharper response characteristic. Each of the referenced patents discloses a relatively uncomplicated analog apparatus which can be utilized at a wellsite to produce an on-the-spot log. The apparatus temporarily stores signals obtained at various vertically spaced levels in a borehole and then combines the stored signals in appropriate manner to obtain effective log readings with improved vertical resolution.

While the signal processing techniques disclosed in the referenced patents provide useful results, the logs produced with these techniques nonetheless represent subsurface readings taken with a device having an effective response of substantial (though improved) vertical extent. To visualize the actual subsurface characteristics which, when measured, had produced the log, one must still take into account this effective response. Accordingly, it is one of the objects of the present invention to provide a method for generating a subsurface characteristic model which is consistent with readings taken with a device having an effective response of substantial vertical extent.

SUMMARY OF THE INVENTION

The present invention is directed to a method for generating a subsurface characteristic model which is substantially consistent with readings taken in a well with a well logging device. The method is preferably implemented by utilizing a general purpose digital computer which may typically be located at a site which is distant from the well.

In the above-referenced copending application of Segesman there is disclosed a method for computer generating a useful subsurface characteristic model. The Segesman method can be described briefly as follows. A set of actual measurement values which represent readings taken over a given depth interval of a well is derived. An initial trial model of the subsurface characteristic under investigation is then selected. Next, a set of simulated measurement values is generated by applying the approximate response characteristic of the logging device to the discrete trial model. The simulated measurement values are compared with the actual measurement values and the initial trail model is then modified in accordance with the comparison. The modified trial model is next utilized to form a new set of simulated measurements which are, in turn, compared with the true measurement values. The model can then be remodified and the procedure continued in iterative fashion until there is obtained a model which yields acceptable simulated measurement values; i.e., simulated measurement values which approximately correspond to the actual measurement values.

When such a model is obtained, there is good indication that the model values are a useful approximation of the subsurface characteristic being investigated.

In an embodiment of the method disclosed by Segesman the comparison between a particular actual measurement value (at a certain depth level) and its corresponding simulated measurement value yields an error value (at that depth level). The various error values are utilized in modifying the discrete trial model during the next iteration.

The present invention utilizes similarly obtained error values to modify a previous generation trial model, but the error values of this invention are applied in a particular manner which facilitates the expeditious achievement of an acceptable model. More specifically, for an error value at a particular depth level, the modification is performed over a depth interval that includes beds which are within a preselected span from the particular depth level. In the preferred embodiment of the invention the size of the preselected span depends upon the vertical extent of the approximate response characteristic of the logging device. In this embodiment, the relative amounts of modification of beds within the preselected span are determined by apportioning the error value among these beds in accordance with the approximate response characteristic of the logging device.

Further features and advantages of the invention will be better understood from the following detailed description when taken in conjunction with the accompanying drawings.

BRIEF DESCRIPTION OF THE DRAWINGS

FIG. 1 is a functional diagram of a system for producing and processing well logging measurements representative of the subsurface characteristics of a well;

FIGS. 2 and 3 are representations of the response characteristic of well logging devices which are helpful in describing the concept of vertical geometrical factor;

FIG. 6 is a simplified block diagram of the invented method;

FIGS. 10A and 10B, when positioned one-below-another comprise FIG. 10 which shows a flow diagram for machine programming an embodiment of the invented method.

DESCRIPTION OF THE PREFERRED EMBODIMENT

Figure 3:
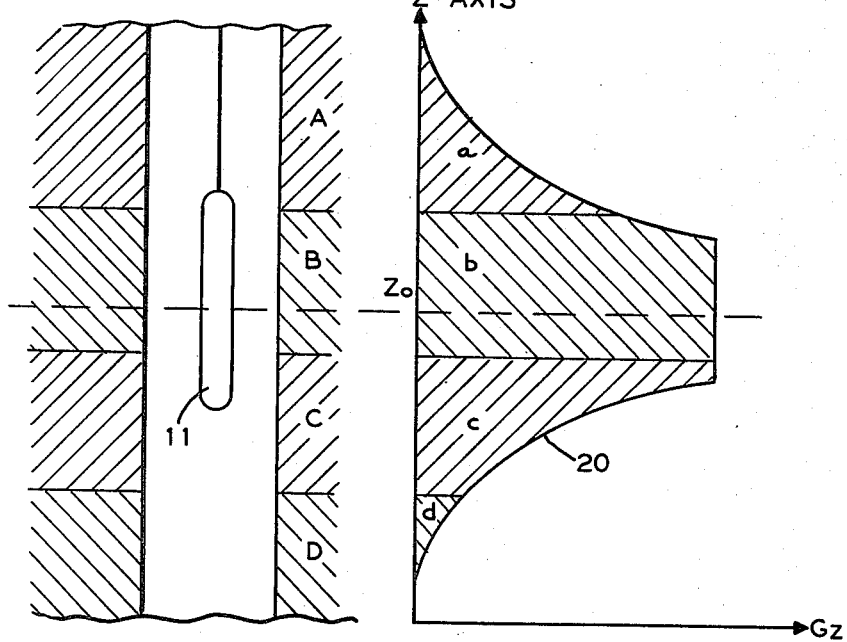

Referring to FIG. 1, there is shown a functional diagram of a system for producing and processing well logging measurements representative of the subsurface characteristics of a well or borehole 10. An investigating device 11 is suspended in the borehole on a cable 12. The length of the cable 12, which determines the relative depth of device 11, is controlled by suitable mechanical depth control means such as a drum and winch mechanism (not shown). The signals from investigating device 11 are coupled via cable 12 to signal processing circuitry 13 which, inter alia, converts the signals to a digital form for recording on a tape recorder 14. As is conventionally practiced, the tape recorder 14 is synchronized with the depth control means, such synchronization being depicted in FIG. 1 by the dashed linkage 15. The digital signals recorded on tape represent measurements taken at various depths in the borehole, typically measurements taken at six inch sampling intervals. The taped measurements are carried or transmitted via communications link to a computer center and entered in a prescribed fashion in a digital computer 16, as is represented by the dotted arrow 17. The computer 16 receives as an input a "derived" set of "true measurement values".

As defined herein, "true measurement values" is a generic term which describes the readings taken in a well with a well logging device. The readings may relate to any type of subsurface characteristic, but most typically would relate to conductivity or resistivity. The readings may be subject to little or no signal processing or to complex processing, coding/decoding or the like. For example, the readings may be utilized in the very form in which they are received from a simple logging device. On the other hand, the readings may be subjected to computed focusing techniques (referenced above), encoding for recording and transmission, decoding, etc., before being entered in the computer. In any event, the "true measurement values" represent, in some form, actual measurements taken in a well or borehole. The contrast of this term with the term "simulated measurement values" will become later apparent.

The term "deriving" as used herein, is also generic and is intended to include in its definition the acts of measuring or of recovering measurements previously taken. In the simplest sense, therefore, the "deriving" of measurements may consist merely of measuring well log readings. On the other hand, the deriving of measurements may consist, for example, of recovering previously taken well log readings from a recording tape or from the receiver of a communications link.

It should be noted here that the particular type of logging device, signal processing circuitry, and recording and communications means utilized to obtain true measurement values is a matter of convenient choice. Indeed, if an appropriate computer were available at the wellsite it would be possible to enter measurement values directly without recording or transmitting these values. As will become understood, the principles of the invention are applicable to different types of true measurement values having a variety of past histories. For ease of illustration, however, let us assume that the device of FIG. 1 is of the conventional induction logging type which measures conductivity (or resistivity), that no computed focusing techniques are employed in the signal processing circuits 13, and that the measurement values recorded on tape are carried to the location of a general purpose digital computer.

In the discussion that follows, use will be made of diagrams representing the cross-section of the ground intercepted by a vertical plane containing the axis of a borehole. Each "region" of ground—which means here a volume of ground having a symmetry of revolution around the borehole—will be represented on such diagrams by its cross-section by the plane of the figure. When dealing with the response of a borehole investigating device it is convenient to make use of descriptive vehicle known as the "vertical geometrical factor". The vertical geometrical factor, and especially its application to induction logging devices, is explained in the abovereferenced Doll article and the above-referenced patents of Doll, Sloughter and Schuster. The vertical geometrical factor takes into quantitative account the fact that the sensitivity region of a logging device positioned at a given measure point actually extends over a substantial vertical region above and below such measure point. The vertical geometrical factor effectively "weights" the contributions to overall device response of different layers of ground depending on their vertical distance from the measure point.

An understanding of the vertical geometrical factor associated with an induction logging device can be gained with the aid of FIG. 2 which depicts an induction sonde positioned at a depth $z_o$ (as determined by the center or so-called "measure point" of the sonde). Assume that all space around the borehole is divided into an infinite number of horizontal beds of minute thickness $\Delta z$, each referred to as a "unit bed" and characterized by its altitude z with respect to the measure point, $z_o$. The vertical geometrical factor of each such unit bed (i.e., its contribution to device response) is designated $G_z$, and the curve 20 is an approximate plot of the $G_z$'s vs. z for a typical induction logging device. The curve 20, referred to as the "vertical investigation characteristic" of the device, is normalized to unity by setting $$\sum_{\text{All } \Delta z} G_z \Delta z = 1,$$

or, in the limit as $\Delta z \to 0$, $$\int_{-\infty}^{+\infty} G_z dz = 1.$$

Consider, now, the four beds, A, B, C and D, of finite thickness shown in FIG. 3. The vertical geometrical factors of the beds, $G_A$, $G_B$, $G_C$ and $G_D$ are equal to their corresponding relative areas under the curve 20, i.e.:

$$G_A = \frac{a}{a+b+c+d}$$

$$G_B = \frac{b}{a+b+c+d}$$

$$G_C = \frac{c}{a+b+c+d}$$

$$G_D = \frac{d}{a+b+c+d}$$

In view of the normalization just mentioned, $a+b+c+d$ equals one, so that $G_A=a$, $G_B=b$, $G_C=c$ and $G_D=d$. Now, if we designate $\sigma_A$, $\sigma_B$, $\sigma_C$ and $\sigma_D$ as the four bed conductivities, the response $L(z_o)$ of the logging device 11 at the depth $z_o$ (i.e., the measured log reading at that depth) can be expressed as $$L(z_o) = G_A\sigma_A + G_B\sigma_B + G_C\sigma_C + G_D\sigma_D \tag{1}$$

or, $$L(z_o) = a\sigma_A + b\sigma_B + c\sigma_C + d\sigma_D \tag{1A}$$

Generally, the response of the logging device at a depth z is $$L(z) = \Sigma G_i \sigma_i \tag{2}$$

where the summation is taken over all beds falling within the response range of the device, and the $\sigma_i$'s and $G_i$'s are the respective conductivities and vertical geometrical factors of these beds. As stated, the vertical geometrical factor of a particular bed is seen to be dependent upon the location of the bed with respect to the device's measuring point. For example, in FIG. 3, if the device were moved to an altitude slightly above $z_o$, the vertical geometrical factor of bed A (viz., area a) would become larger while the vertical geometrical factor of bed D (viz., area d) would become smaller.

The problem associated with utilizing a device having a relatively wide vertical response, as previously discussed, should now be readily apparent. For example, referring again to FIG. 3, the measure point $z_o$ of device 11 is located in the approximate center of bed B and, ideally, the device should be indicating a reading which only reflects the conductivity, $\sigma_B$, of bed B. However, the reading indicated by the logging device will, in reality, be determined by equation (1) or (1A) wherein $L(z_o)$ depends upon the conductivities $\sigma_A$, $\sigma_C$, and $\sigma_D$ as well as upon $\sigma_B$. It should be noted in this context that the relative width of the device response must be considered with relation to the width or thickness of the beds being examined. This can be illustrated, for instance, by considering the case where bed B is relatively wide and extends over the entire depth interval depicted in FIG. 3. In such case the reading taken at $z_o$ would be equal to $G_B\sigma_b$, there being no other beds lying within the device response curve. Also, due to the unity normalization of the vertical geometrical factor, $G_B$ would equal one so that the logging device would indicate a reading which substantially equals $\sigma_B$, the actual conductivity of bed B. Unfortunately, formation beds encountered in real-life situations are often substantially thinner than the effective device response width.

The technique of the present invention enables determination of a useful model of subsurface bed conductivity values notwithstanding the vertical resolution limitations of well logging devices. In obtaining a meaningful model it is helpful to assume that the subsurface formations being studied consist of well-defined beds of finite width each having a conductivity (or other measured parameter) which is essentially constant within the bed. Such simplifying assumptions are not strictly accurate, of course, since formation beds deposited by nature are not exactly homogeneous and well defined. Stratified geological models of the type utilized herein are, however, generally consistent with natural depositional considerations and are expedient since exact geological solutions are not feasible in a practical sense.

Figure 4A:
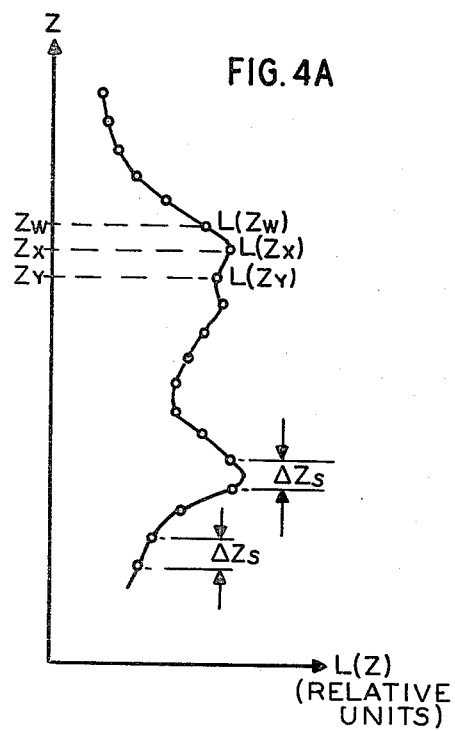
FIG. 4A is a log of conductivity readings taken at specified sampling intervals.
Figure 5:
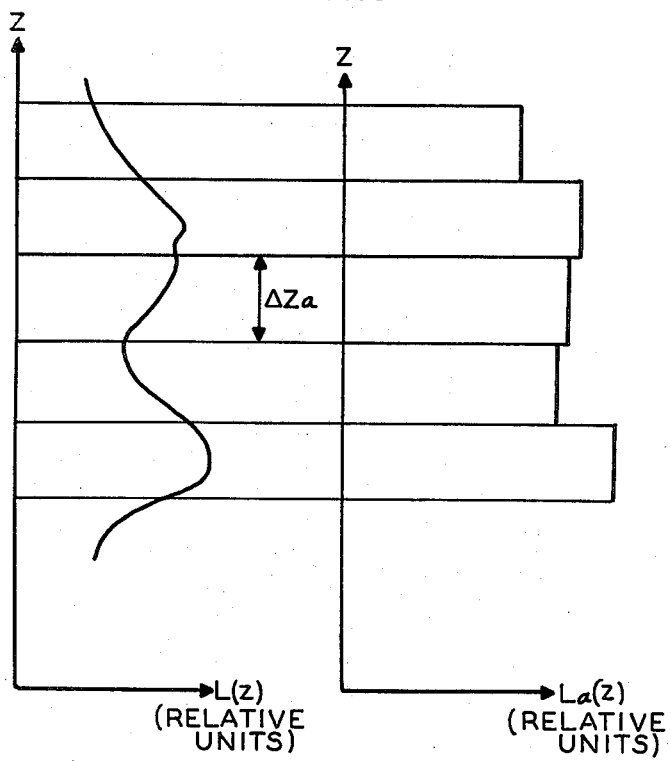
FIG. 5 shows a log of conductivity readings and a corresponding graph of averaged conductivity readings.

The tape of recorder 14 of FIG. 1 has recorded thereon a set of true measurement values taken over a given depth interval of the well 10. Referring to FIG. 4A, there is illustrated a "log" of conductivity readings $L(z)$ taken at sample intervals denoted $\Delta z_s$. As was previously indicated, $\Delta z_s$ is typically six inches, but it will become clear that the method of the invention is not dependent upon the sampling interval and, for example, readings derived from a "continuous" log could be readily utilized herein. (The resolution of the original log is, however, limited by the sampling interval, so an unduly large sampling interval is not desirable.) In FIG. 5, the readings over a number of "averaging intervals" of width $\Delta z_a$ are averaged to yield a set of discrete conductivity values $L_a(z)$. The width $\Delta z_a$ can be taken over several sampling intervals and may be, for example, of the order of the two feet. The decision as to whether or not to use a data selection technique such as averaging depends upon chosen limitations on machine computation time, required accuracy of results, and other factors to be discussed hereinafter.

Figure 4B:
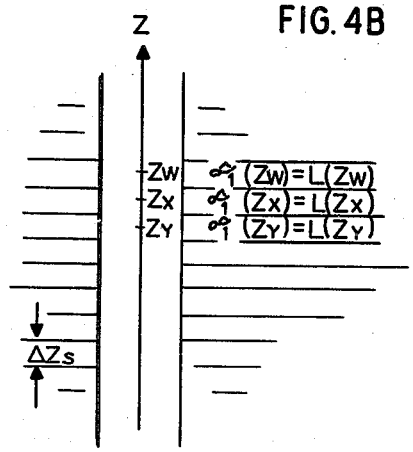
FIG. 4B is a first approximation model of subsurface formations based upon the log of FIG. 4A.

Referring to FIG. 6, there is shown a simplified block diagram of the method of the present invention. The block 51 represents the step of deriving a set of true measurement values taken with a well logging device. The true measurement values may be, for example, the readings as a function of depth depicted by the points of FIG. 4. These true measurement values are stored in the memory of a digital computer. The next step, as represented by block 52, is to select a discrete model of the subsurface characteristic surrounding the well being investigated. This model may be thought of as a first approximation of the subsurface characteristic being studied. In a preferred embodiment of the invention, the selected model is taken from the true measurement values themselves. Thus, as in FIG. 4B, the model of subsurface formations can be visualized as consisting of a plurality of beds of equal thickness, $\Delta z_s$. The conductivity of each bed in this first model, designated $\hat{\sigma}_1(z)$, is determined by the measured value $L(z)$ at the particular depth level of the bed. For example, at a depth $z_w$, the indicated log reading is $L(z_w)$ (FIG. 4A). Therefore in the model (FIG. 4B), a bed of thickness $\Delta z_s$ is centered at a depth $z_w$ and this bed is assumed to have a conductivity throughout of $L(z_w)$. Similarly, the beds at the depth levels $z_x$ and $z_y$ have respective original model conductivities of $L(z_x)$, $L(z_y)$, and so on. In the present embodiment, the original model is formed by the computer (from the true measurement values) and stored therein, but an externally generated original model could, if desired, be read into computer memory.

The next steps of the method are to select a particular depth level (block 53 of FIG. 6) and then to generate a simulated measurement value at that particular depth level. This is accomplished by applying the approximate response characteristic of the logging device to the model. As used herein for purposes of this step, the term "response characteristic of the logging device" is intended to reflect the overall response of the equipment used to obtain the true measurement values; i.e., the downhole device and any auxiliary equipment such as computed focusing devices and the like. In the illustrative situation of FIG. 1, the induction logging device 11 is assumed to have an approximate vertical response characteristic of the form shown in FIG. 2. For other types of equipment, the approximate response curve may be sharper or broader or, perhaps, asymmetrical.

Figure 7:
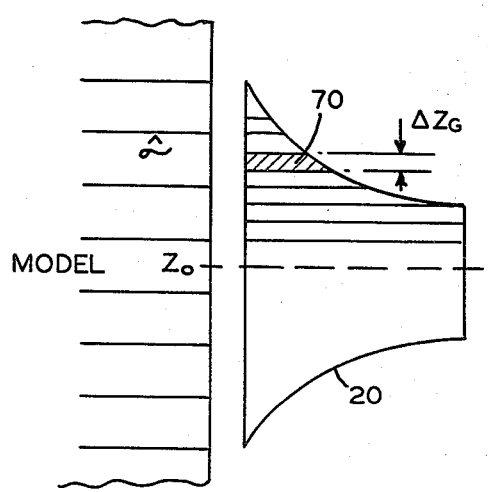
FIGS. 7 and 8 show representations of logging device characteristics as positioned alongside discrete models of subsurface formations.
Figure 8:
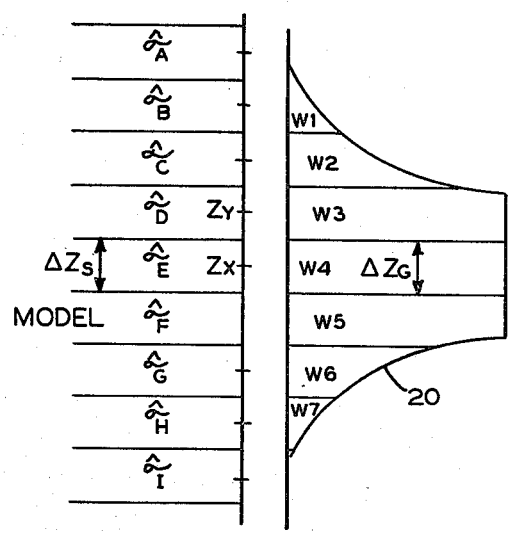

The simulated measurement values can be generated by programming the computer to calculate a value at the particular depth level of interest which is in accordance with the above equation 2. This process utilizes the vertical geometrical factor concept and is readily visualized with the aid of FIGS. 7 and 8. In FIG. 7, the device's normalized vertical investigation characteristic curve 20 is pictured alongside a conductivity model and centered at a depth level $z_o$. The area under the curve 20 is shown as divided into a plurality of strips of equal width $\Delta z_g$. It follows from the discussion above relating to FIGS. 2 and 3 that the simulated device measurement can be calculated by multiplying the area of each strip by the conductivity of the model bed adjacent the strip and then summing these products. For example, in FIG. 7, the area of the strip 70 would be multiplied by the adjacent model bed conductivity $\hat{\sigma}_r$, and this product added to the similarly computed products for all other strips to obtain the simulated device response at depth $z_o$. The strip areas or "weighting factors", as a function of their distance from the curve center, are fed as input information to the computer which then, using the model conductivities, calculates the desired sum-of-products at the desired measuring point. To facilitate computer calculation of simulated measurement values, it is convenient to choose a strip width which is an integral submultiple or multiple of the model bed width. If this is not done, it will be necessary to calculate the contributions of strips which overlap adjacent beds of differing conductivities. Thus, for example, in FIG. 8 the strip width $\Delta z_g$ is selected equal to the model bed width $\Delta z_g$. The simulated measurement at the depth $z_x$, denoted $\hat{L}(z_x)$, can be conveniently calculated as $$\hat{L}(z_x) = w_1\hat{\sigma}_B + w_2\hat{\sigma}_C + w_3\hat{\sigma}_D + w_4\hat{\sigma}_E + w_5\hat{\sigma}_F + w_6\hat{\sigma}_G + w_7\hat{\sigma}_H$$

where $w_1$ through $w_7$ are the normalized weighting factors of the response curve 20. If the device was "moved" (in the simulated sense) to the new calculation point, $z_y$, the simulated measurement would be $$\hat{L}(z_y) = w_1\hat{\sigma}_A + w_2\hat{\sigma}_B + w_3\hat{\sigma}_C + w_4\hat{\sigma}_D + w_5\hat{\sigma}_E + w_6\hat{\sigma}_F + w_7\hat{\sigma}_G.$$

The simulated measurement at any point of interest can be calculated in this manner.

Having generated a simulated measurement, $\hat{L}(z)$, at the particular depth level, the next step of the invention is to compare this simulated measurement value to the true measurement value at that depth level, $L(z)$ and generate an error value in accordance with the comparison. This function is represented by the block 55. The error value, which is generated by the computer, gives indication as to the accuracy of the model in the region of the particular depth level; i.e., in a region having a span which corresponds to the vertical extent of the approximate response characteristic of the logging device. The portion of the model within the span is modified (block 56) in accordance with the error value. More specifically, and as will become clear, the relative amounts of modification of model beds within the span are determined by apportioning the error value among such beds in accordance with the approximate response characteristic of the logging device. By so doing, the error is apportioned among these beds in proportion to the effect that they had had on the simulated reading which gave rise to the error.

The branch 56A indicates that the next phase of the method is the consideration of a new particular depth level, as is most easily accomplished in the computer by incrementation of a depth level index. The functions of blocks 54, 55 and 56 are then performed at the new depth level which is then again incremented. This technique is continued until all depth levels in a given depth interval under consideration have been treated.

Figure 9:
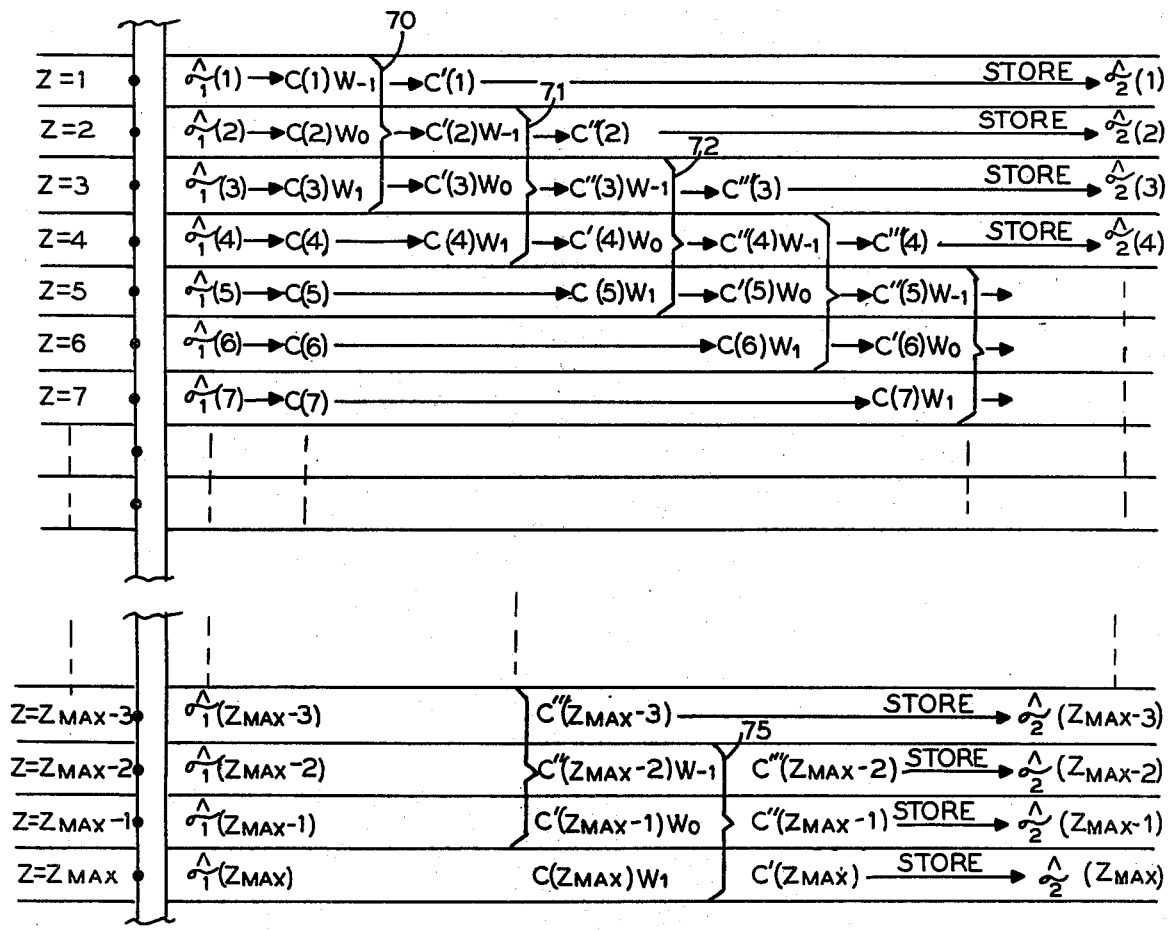
FIG. 9 is a model of a subsurface depth interval to which the method of the invention is applied.

Referring to FIG. 9, there is shown a given depth interval under consideration which contains successive depth levels designated $z=1, z=2 \ldots, z=z_{max}$. In FIG. 9, for convenience of illustration, the vertical response characteristic of the logging device is considered as extending over only three depth units. It will be understood, however, that the principles of the method to be described with the aid of this Figure are easily extendable to apply to a longer and more practical device response. The three geometrical weighting factors associated with the device response are designated, in order of decreasing depth level, as $w_{-1}$, $w_o$ and $w_1$. The convenience of this particular subscripting choice will become later apparent. The initial model bed conductivities at the various depth levels are listed along the left side of the figure as $\hat{\sigma}_1(1), \hat{\sigma}_1(2), \hat{\sigma}_1(3) \ldots, \hat{\sigma}_1(z_{max})$. An "enhanced" set of bed conductivities, comprising a second complete model, is shown along the right side of the figure as $\hat{\sigma}_2(1), \hat{\sigma}_2(2), \hat{\sigma}_2(3) \ldots, \hat{\sigma}_2(z_{max})$. The second model and each succeeding new model, is obtained after a complete pass through the program of the invented method.

During each pass through the program a dummy conductivity variable, "C(z)" is set up and temporarily utilized. It will be seen that at each depth level the variable C(z) may change its value a number of times, and the notation of FIG. 9 is such that each time C(z) is changed it picks up an additional "prime" superscript. For example, the notation "C'''(z)" means that during a particular pass the variable at depth level z has been changed three times.

The dummy variable C(z) is first set equal to the first model conductivity at each depth level; so that $C(1) = \hat{\sigma}_1(1)$, $C(2) = \hat{\sigma}_1(2)$, $C(3) = \hat{\sigma}_1(3)$, . . . , $C(z_{max}) = \hat{\sigma}_1(z_{max})$. The device response characteristic is then pictured as being positioned (in the simulated sense) at the first measure point at the top of the interval at which a measurement depends only on beds within the given interval; i.e., $z=2$ (bracket 70). The simulated measurement at $z=2$ is calculated as $$\hat{L}_1(2) = C(1)w_{-1} + C(2)w_o + C(3)w_1 \tag{3}$$

where the subscript "1" in $\hat{L}_1(2)$ indicates that this is the simulated measurement during the first iteration. An error value at $z=2$ is next calculated by subtracting the simulated measurement value $\hat{L}_1(2)$ from the true measurement value $L(2)$ to get $$E_1(2) = L(2) - \hat{L}_1(2). \tag{4}$$

The calculated error is then "apportioned" among the model beds which had affected the simulated measurement value at $z=2$; viz, the beds at $z=1$, $z=2$ and $z=3$. The portion of the error attributed to each of these beds is determined by the relative weight of each bed in the calculation of $\hat{L}_1(2)$, so we have:

$$\left. \begin{array}{l} C'(1) = C(1) + \dfrac{w_{-1}}{K} E_1(2) \\[4pt] C'(2) = C(2) + \dfrac{w_o}{K} E_1(2) \\[4pt] C'(3) = C(3) + \dfrac{w_1}{K} E_1(2) \end{array} \right\} \tag{5}$$

The constant K is preferably chosen such that the modified conductivity values would give rise to a simulated measurement value at the depth level being considered which is equal to the true measurement value at that depth level. The appropriate constant can be shown to be the sum of squares of the weighting factors; i.e., $$K = w_{-1}^2 + w_o^2 + w_1^2. \tag{6}$$

This choice of K can be tested by calculating what the response would be at $z=2$ when using the modified conductivity values, as follows:

$$\hat{L}(2) \text{ (modified)} = w_{-1}C'(1) + w_o C'(2) + w_1 C'(3).$$

Substituting for the C' values of equations (5), and expanding and clearing terms gives:

$$\hat{L}(2) \text{ (modified)} = w_{-1}C(1) + w_o C(2) + w_1 C(3) + \dfrac{w_{-1}^2 + w_o^2 + w_1^2}{K} E_1(2)$$

Substituting $\hat{L}_1(2)$ for the first term (equation (3)) and cancelling the coefficient of $E_1(2)$ (equation (6)) gives:

$$\hat{L}(2) \text{ (modified)} = \hat{L}_1(2) + E_1(2)$$

which, according to equation (4), equals $L(2)$, the desired result.

Returning to the method, after calculation of the modified dummy values C', the device response characteristic can be thought of as being moved down one depth level to the measure point $z=3$ (bracket 71). (For convenience of explanation, the depth units of FIG. 9 are considered from top to bottom although the true measurement values were, of course, typically taken in the opposite direction.) The dummy value which passes out of the bracket, C'(1), is stored as $\hat{\sigma}_2(1)$. A new C value, C(4), is picked up and included within the bracket, so the simulated response at $z=3$ is $$\hat{L}_1(3) = C'(2)w_{-1} + C'(3)w_o + C(4)w_1.$$

The error value at $z=3$ is then calculated and apportioned as follows:

$$E_1(3) = L(3) \text{ and } \hat{L}_1(3)$$
and
$$C''(2) = C'(2) + \dfrac{w_{-1}}{K} E_1(3)$$
$$C''(3) = C'(3) + \dfrac{w_o}{K} E_1(3)$$
$$C'(4) = C(4) + \dfrac{w_1}{K} E_1(3)$$

Now, once again the device characteristic can be thought of as being moved down one depth level to the measure point $z=4$ (bracket 72). Again, the value which passes out of the bracket, C''(2), is stored as $\hat{\sigma}_2(2)$ and a new C value, C(5), is picked up and included within the bracket. Continuing in this manner, the appropriate equations for the next two measure points are:

$$z = 4 \quad \hat{L}_1(4) = C''(3)w_{-1} + C'(4)w_o + C(5)w_1$$
$$E_1(4) = L(4) - \hat{L}_1(4)$$
$$C'''(3) = C''(3) + \frac{w_{-1}}{K} E_1(4)$$
$$C''(4) = C'(4) + \frac{w_o}{K} E_1(4)$$
$$C'(5) = C(5) + \frac{w_1}{K} E_1(4)$$
$$\longrightarrow C'''(3) \text{ stored as } \hat{\sigma}_2(3)$$

$$z = 5 \quad L_1(5) = C''(4)w_{-1} + C'(5)w_o + C(6)w_1$$
$$E_1(5) = L(5) - \hat{L}_1(5)$$
$$C'''(4) = C''(4) + \frac{w_{-1}}{K} E_1(5)$$
$$C''(5) = C'(5) + \frac{w_o}{K} E_1(5)$$
$$C'(6) = C(6) + \frac{w_1}{K} E_1(5)$$
$$\longrightarrow C'''(4) \text{ stored as } \hat{\sigma}_2(4)$$

After moving away from the end of the depth interval under consideration, the general pattern of the method becomes clear. Each dummy conductivity value of the model is modified one time for each weighting factor of the device characteristic which passes through it (i.e., three times in FIG. 9). The modified dummy values are utilized in subsequent calculations and remodified until they pass out of the range of the device characteristic at which time they are stored as the next generation model bed conductivities. When the complete second model is obtained, the new bed conductivity values, $\hat{\sigma}_2(1)$, $\hat{\sigma}_2(2)$, $\hat{\sigma}_2(3)$, ..., $\hat{\sigma}_2(z_{max})$, can be utilized as a basis for generating a further improved model, $\hat{\sigma}_3(1)$, $\hat{\sigma}_3(2)$, $\hat{\sigma}_3(3)$, ..., $\hat{\sigma}_3(z_{max})$. This process can be continued iteratively for either a predetermined number of iterations, or, until the calculated error values fall below some prescribed threshold value.

Figure 10A:
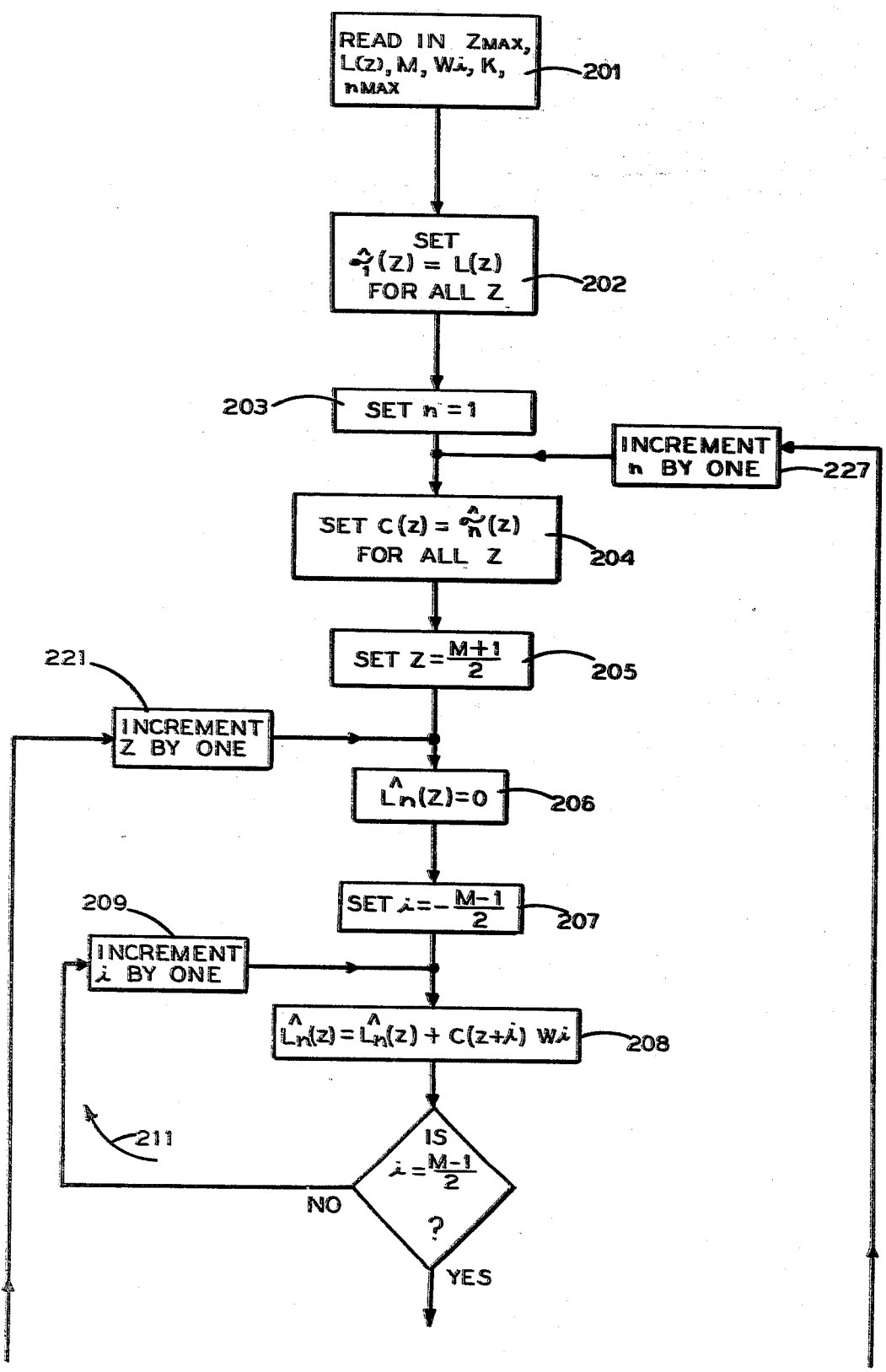

Referring to FIG. 10, there is shown a flow diagram for machine programming the method of this embodiment. The block 201 represents the function of reading into the computer the following parameters, some of which have been previously defined:

$z_{max}$ = number of sample intervals comprising the depth interval under consideration.

L(z) = true measurement values at each depth level in the interval.

M = number of depth units in vertical extent of device response characteristic.

$w_i$ = geometrical weighting factors associated with the device response characteristic ($w_{-1}$, $w_o$ and $w_1$ in FIG. 9).

K = sum of squares of geometrical weighting factors.

$n_{max}$ = maximum allowable number of iterations.

The block 202 represents the step of establishing the first model conductivity values, $\hat{\sigma}_1(z)$, as equal to the measured values L(z) at each depth level of the interval. As used herein, the subscript notation "n" for the variables $\hat{\sigma}_n(z)$, $\hat{L}_n(z)$, and $E_n(z)$, indicates the current iteration count; so that, for example, $\hat{\sigma}_1(10)$, $\hat{L}_1(10)$, and $E_1(10)$ respectively represent the model conductivity value, simulated measurement value, and error value for the depth level z = 10 during the first iteration. The index n is initially set to unity, as indicated by the block 203.

The next step of the method, as represented by block 204, is to set up the dummy conductivity variable, C(z), as equal to latest model conductivity at each depth level of the interval. (In the description of FIG. 9 a "prime" notation was utilized to keep track of changes in the dummy variable C(z). In the programmed method of FIG. 10, however, the prime notation is not used since a modified value of C(z) at a given depth level can simply replace any former C(z) value in computer memory.) The depth level index z is then set to the first value at which a simulated measurement value is to be calculated; viz., the "end" measure point, z = (M+1)/2 (block 205). The first simulated measurement value $\hat{L}_1(z)$, is next calculated for this value of z as follows: $\hat{L}_1(z)$ is initialized at zero (block 206) and the index i is set to −(M−1)/2 (block 207). The value of $L_1(z)$ is then increased by an amount C(z+i)$w_i$ (block 208), i is incremented by one (block 209), and $\hat{L}_1(z)$ again increased by an amount C(z+i)$w_i$. The small loop, indicated by the loop arrow 211, continues in this fashion until the value of $\hat{L}_1(z)$ becomes $$L_1(z) = \sum_{i=-\frac{M-1}{2}}^{i=\frac{M-1}{2}} C(z+i)w_i \quad (7)$$

which is the appropriate simulated measurement value at the designated depth level z. To illustrate the method up to this point, and referring again to FIG. 9, the setting of z to a value (M+1)/2 (with M = 3 in FIG. 9) means setting z = 2 with a resultant simulated device response position as indicated graphically by the bracket 70. The range of i for M = 3 is −1 to +1, so that the summation of equation (7) becomes:

$$\hat{L}_1(z=2) = C(1)w_{-1} + C(2)w_{-0} + C_3w_{+1}$$

which is seen graphically to be the appropriate sum-of-products for the simulated measurement at the depth level z = 2.

Referring again to FIG. 10, after generating the simulated measurement value $\hat{L}_1(z)$ for the depth level being considered, an error value $E_1(z)$ is calculated as the difference between the true measurement value L(z) and the simulated measurement value $\hat{L}_1(z)$ at that depth level. The next phase of the program, represented by the loop 213, deals with the apportioning of the error among the C(z) values which fall within the span of the device characteristic when positioned at the particular z under consideration. The index i is set to −(M−1)/2 (block 214) and the variable C is adjusted (block 215) according to the relationship $$C(z+i) = C(z+i) + \frac{w_i}{K} E_n(z). \quad (8)$$

In other words, the value of the variable C stored in memory for the depth level (z+i) is altered by an amount $$\frac{w_i}{K} E_n(z).$$

It should be noted that the change can be either an increase or a decrease depending upon the polarity of $E_n(z)$. The index i is then incremented by one (block 216) and the next C value is altered by an amount $$\frac{w_i}{K} E_n(z).$$

The loop 213 continues in this fashion until decision diamond 217 indicates that $$i = \frac{M-1}{2};$$

i.e., that all C values in the span have been altered. When this condition is met, the C value at the highest depth level in the span, i.e., $$C\left(z - \frac{M-1}{2}\right),$$

is stored (block 218) as the new model bed conductivity, $\sigma_{n+1}$, at that depth level.

To illustrate this most recently described phase of the programmed method, and referring again to FIG. 9, recall that the values $\hat{L}_1(z=2)$ and $\hat{E}_1(z=2)$ have been calculated for the position of bracket 70. The block 214 indicates that i is now set equal to $-(M-1)/2$, which is $i=-1$ for the case of FIG. 9. The block 216 and diamond 217 indicate that i will also assume values of 0 and +1 for this excursion through loop 213. The three resultant equations of block 215 are therefore:

$$C(1) = C(1) + \frac{w_{-1}}{K} E_1(2)$$

$$C(2) = C(2) + \frac{w_0}{K} E_1(2)$$

$$C(3) = C(3) + \frac{w_1}{K} E_1(2),$$

and these equations are seen to correspond to the equations (5) developed above. Next, the block 218 indicates the storage of the modified value of $$C\left(z - \frac{M-1}{2}\right)$$

[equals C(2-1) equals C(1) for our case] as $\hat{\sigma}_2(1)$, which is consistant with the storage operation indicated for the topmost bed of FIG. 9.

The depth level index is next examined (decision diamond 220) to determine if z has reached a value of $z_{max} - (M-1)/2$ (i.e., the last depth level at which the entire span still lies within the given depth interval). If not, z is incremented by one which means, in terms of FIG. 9, that the new span under consideration is shown by the bracket 71. The values of $\hat{L}_1(3)$, $E_1(3)$ and the modified C's are then calculated for this new span, and the modified C(2) is stored as $\hat{\sigma}_2(2)$ (second bed from the top in FIG. 9). Thus, during each excursion through the large loop 219, the values of $\hat{L}_1(2)$ and $E_1(2)$ are calculated for the current depth level, the C values in the span corresponding to the current depth level are modified, and the modified C value for the highest depth level in the span is stored as a $\hat{\sigma}_2$ value.

When the diamond 220 indicates that z has reached a value of $z_{max} - (M-1)/2$, the procedure of loop 219 should not be continued since the bottom of the span has reached the lower end of the given interval. This situation is illustrated by the bracket 75 of FIG. 9. At such time the diamond 220 directs the program toward the loop 221 which accomplishes the storage of the C values which remain within the last span of the given interval. The index z is reset to $z_{max} - M + 1$, (block 222) which is the highest depth level within this last span. The C value for this depth level is then stored as a $\hat{\sigma}_2$ value (block 223), z is incremented (block 224), and the action of loop 221 continues until the last depth level in the given interval, $z_{max}$, is reached (block 225). Again, in terms of FIG. 9, when z reaches $z_{max} - 2$ (block 220) z is reset to $z_{max} - 2$ (block 222). The values of $C(z_{max} - 2)$, $C(z_{max} - 1)$ and $C(z_{max})$ are then respectively stored as $\hat{\sigma}_2(z_{max} - 2)$, $\hat{\sigma}_2(z_{max} - 1)$ and $\hat{\sigma}_2(z_{max})$ by the action of loop 221.

After exit from the diamond 225 an entire new conductivity model, $\hat{\sigma}_2(z)$, for all z in the given interval, has been generated. The iteration index n is next examined (block 226) to determine if the preselected iteration maximum has been reached. If not, the program is directed to block 227 via branch 226A, and the index n is incremented to 3. The above-described method is then applied to the model $\hat{\sigma}_2$ and a further improved model, $\hat{\sigma}_3$, is generated. The method is continued iteratively in this fashion until $n_m$ is reached.

The last block 228 of FIG. 10 represents the print-out of the last model generated using the programmed method. Other informative listings may also be outputted, e.g., the last calculated values of $\hat{L}_n(2)$ or $E_n(z)$. If desired, a final set of simulated measurement values, $\hat{L}_{n+1}(2)$ [and corresponding error values $E_{n+1}(2)$] calculated from the last model conductivity values, $\hat{\sigma}_{n+1}(2)$, may be obtained by performing the operation of loop 211 on this last model.

It will be appreciated that the generated model conductivities for beds lying near the ends of the given interval cannot be expected to be as accurate as those nearer the center of the interval. This is because the true measurement values near the ends of the given interval are partially dependent upon the conductivities of formation beds which are external to the interval. When modifying the model bed conductivities, information concerning such external formation beds is not utilized. Fortunately, the inaccuracies caused by such "end effects" are diminished towards the center of the interval, so the reliability of the final model can be increased by discarding the model values near the ends of the interval.

The foregoing method of model generation has been described with reference to data processing techniques preferably implemented by the programming of a general purpose digital computer. However, it is to be understood that the method of the present invention could be implemented with other calculating apparatus, for example a special purpose analog or digital computer constructed to perform the described steps. Also, while an induction logging device has been used to illustrate the invented method, it should be again stressed that the invention also applies to other types of subsurface investigation devices.

What is claimed is:

1. A well logging method of producing a representation of the vertical arrangement of subsurface earth formation beds with respect to a subsurface characteristic, which representation is substantially consistent with measurements of the subsurface characteristic taken in a well in the formation with a well logging device, comprising:

(a) producing a set of initial well logging measurements of the subsurface characteristic derived from the measurements taken in the well with the well logging device over a given depth interval;

(b) selecting a trial variation of the subsurface characteristic with depth in the well, said trial variation comprising a trial arrangement of subsurface beds;

(c) computer-generating a new well logging measurement at a particular depth level by applying the approximate response characteristic of the logging device to the trial variation of the subsurface characteristic;

(d) computer-comparing the new well logging measurement at the particular depth level to the initial well logging measurement at that depth level and computer generating an error value as a function of the comparison; and (e) computer-modifying the trial variation of the subsurface characteristic in accordance with the error value, the modification being performed over a depth interval which includes the beds of the trial arrangement of beds which are within a preselected span from the particular depth level, to produce a visual or a stored record of said representation of the arrangement of earth formation beds with respect to said subsurface characteristic.

2. A well logging method as in claim 1 wherein the steps (c) through (e) are computer performed for other particular depth levels within the given depth interval.

3. A well logging method as in claim 2 wherein the extent of said preselected span depends upon the extent of the approximate response characteristic of the logging device.

4. A well logging method as in claim 2 wherein each modification of step (e) is determined by apportioning the error value in accordance with the approximate response characteristic of the logging device.

5. A well logging method as in claim 4 wherein said trial variation of the subsurface characteristic is originally selected from the initial well logging measurements.

6. A well logging method as in claim 2 wherein said trial variation of the subsurface characteristic is a function of the initial well logging measurements.

7. A well logging method as in claim 2 wherein said trial arrangement of subsurface beds consists of a plurality of beds of equal width.

8. A well logging method as in claim 2 wherein the steps (c) through (e) are repeated for the particular depth levels in an iterative fashion.

9. A well logging method as in claim 1 wherein the modification of step (e) is determined by apportioning the error value in accordance with the approximate response characteristic of the logging device.

10. A well logging method of producing a representation of the arrangement of subsurface earth formation beds with respect to a subsurface characteristic, which representation is substantially consistent with measurements taken in a well in the formation with a well logging device, comprising:

(a) measuring said subsurface characteristic in the well with the well logging device to produce a set of initial well logging measurements over a given depth interval of the well;

(b) selecting a discrete trial variation of the subsurface characteristic with depth in the well which comprises a trial arrangement of subsurface beds;

(c) generating, by a computer, a new well logging measurement at a particular depth level by applying the approximate response characteristic of the logging device to the trial variation;

(d) comparing, by a computer, the new well logging measurement at the particular depth level to the initial well logging measurement at that depth level and generating, by a computer, an error value as a function of the comparison; and (e) modifying the trial variation, by a computer, in accordance with the error value, the modification being performed over a depth interval which includes subsurface beds of the trial arrangement of beds which are within a preselected span from the particular depth level.

11. A well logging method as in claim 10 wherein the steps (c) through (e) are performed, by a computer, for other particular depth levels within the given depth interval.

12. A well logging method as in claim 11 wherein the extent of said preselected span depends upon the vertical extent of the approximate response characteristic of the logging device.

13. A well logging method as in claim 11 wherein each modification of step (e) is determined by apportioning the error value in accordance with the approximate response characteristic of the logging device.

14. A well logging method as in claim 13 wherein said trial variation of the subsurface characteristic is originally selected from the set of initial well logging measurements.

15. A well logging method as in claim 11 wherein the steps (c) through (e) are repeated for the particular depth levels in an iterative fashion.

16. A well logging method as in claim 11 wherein said trial variation of the subsurface characteristic is originally selected from the set of initial well logging measurements.

17. A well logging method as in claim 11 wherein said trial arrangement of subsurface beds consists of a plurality of beds of equal width.

18. A well logging method as in claim 10 wherein the modification of step (e) is determined by apportioning the error value in accordance with the approximate response characteristic of the logging device.

19. A well logging method of producing a representation of the arrangement of subsurface earth formation beds with respect to a subsurface characteristic, which representation is substantially consistent with measurements of the characteristic taken in a well in the formation with a well logging device, comprising:

(a) deriving a set of initial well logging measurements taken with the well logging device at various depth levels in the well over a given depth interval;

(b) selecting a discrete trial variation of the subsurface characteristic with depth in the well which comprises a trial arrangement of subsurface beds;

(c) programming and operating a computer to generate a new well logging measurement at a particular depth level by applying the approximate response characteristic of the logging device to the trial variation;

(d) programming and operating a computer to compare the new well logging measurement at the particular depth level to the initial well logging measurement at that depth level and to generate an error value as a function of the comparison; and (e) programming and operating a computer to modify the trial variation of the subsurface characteristic in accordance with the error value, the modification being performed over a depth interval which includes beds of the trial arrangement which are within a preselected span from the particular depth level, to thereby produce a visual or a stored record of said representation of the arrangement of subsurface earth formation beds.

20. A well logging method as in claim 19 wherein the computer is programmed and operated to perform the steps (c) through (e) for other particular depth levels within the given depth interval.

21. A well logging method as in claim 20 wherein the extent of said preselected span depends upon the vertical extent of the approximate response characteristic of the logging device.

22. A well logging method as in claim 20 wherein each modification of step (e) is determined by apportioning the error value in accordance with the approximate response characteristic of the logging device.

23. A well logging method as in claim 22 wherein said trial variation of the subsurface characteristic is originally selected from the set of initial well logging measurements.

24. A well logging method as in claim 20 wherein the steps (c) through (e) are repeated for the particular depth levels in an iterative fashion.

25. A well logging method as in claim 20 wherein said trial variation of the subsurface characteristic is originally selected from the set of initial well logging measurements.

26. A well logging method as in claim 20 wherein said trial arrangement of subsurface beds consists of plurality of beds of equal width.

27. A well logging method as in claim 19 wherein the modification of step (e) is determined by apportioning the error value in accordance with the approximate response characteristic of the logging device.

28. A well logging method of producing, by a computer, a representation of the arrangement of subsurface earth formation beds with respect to the subsurface conductivity of an earth formation, which representation is substantially consistent with subsurface electrical conductivity measurements taken in a well in the formation with an induction logging device, comprising:

(a) deriving a set of initial subsurface electrical conductivity by measuring the conductivity in the well with the induction logging device over a given depth interval;

(b) selecting a trial variation of the subsurface conductivity;

(c) generating a new subsurface conductivity measurement at a particular depth level by applying the approximate response characteristic of the logging device to the trial variation;

(d) comparing the new subsurface conductivity measurement at the particular depth level to the initial conductivity measurement at that depth level and generating an error value as a function of the comparison; and (e) modifying the trial variation in accordance with the error value, the modification being performed over a depth interval which includes beds defined by the trial variation which are within a preselected span from the particular depth level.

29. A well logging method as in claim 28 wherein the steps (c) through (e) are performed for other particular depth levels within the given interval.

30. A well logging method as in claim 29 wherein the extent of said preselected span depends upon the vertical extent of the approximate response characteristic of the logging device.

31. A well logging method as in claim 29 where each modification of step (e) is determined by apportioning the error value in accordance with the approximate response characteristic of the logging device.

32. A well logging method as in claim 29 wherein the steps (c) through (e) are repeated for the particular depth levels in an iterative fashion.

33. A well logging method as in claim 29 wherein said trial variation is originally selected from the set of initial measurements.

34. A well logging method as in claim 29 wherein said trial variation consists of a plurality of discretely-boundaried beds which are of equal width.

35. A well logging method as in claim 29 wherein the modification of step (e) is determined by apportioning the error value in accordance with the approximate response characteristic of the logging device.

36. A computer system for use in well logging to produce a representation of the arrangement of subsurface earth formation beds with respect to a subsurface characteristic, which representation is substantially consistent with readings taken in a well in the formation with a well logging device, comprising (a) means for deriving a set of initial well logging measurements which represent readings taken with the well logging device over a given depth interval of the well; and (b) means for:
  (i) selecting a trial variation of the subsurface characteristic with depth in the well;
  (ii) generating a new well logging measurement at a particular depth by applying the approximate response characteristic of the logging device to the trial variation;
  (iii) comparing the new well logging measurement at the particular depth level to the initial well logging measurement at that depth level and generating an error value as a function of the comparison; and
  (iv) modifying the trial variation in accordance with the error value, the modification being performed over a depth interval which includes beds defined by the trial variation which are within a preselected span from the particular depth level, to derive said representation of the arrangement of subsurface beds and producing a visual or a stored record of a tangible map thereof.

37. A method of exploring a subsurface earth formation comprising:

(a) producing initial well logging measurements derived from a well logging device passed over a given depth interval through a well in the subsurface earth formation and operated to take said initial measurements of a characteristic of the earth formation adjacent the well at selected depths in the well, said logging device having a selected approximate response characteristic;

(b) producing a selected trial variation of the characteristic with depth in the well;

(c) generating a new well logging measurement at a particular depth level by applying the approximate response characteristic of the logging device to the trial variation of the subsurface characteristic;
(d) comparing the new well logging measurement at the particular depth to the initial well logging measurement at that depth and generating an error value as a function of the comparison;
(e) modifying the trial variation in accordance with the error value, the modification being performed over a given depth interval which includes beds defined by the trial variation which are within a preselected span from the particular depth level; and
(f) repeating steps (c), (d) and (e) for other particular depth levels within the given depth interval to thereby produce a representation of the arrangement of earth formation beds with respect to said subsurface characteristic, and plotting a visual or a stored record of said representation.

* * * * *